United States Patent [19]

Sheilds et al.

[11] Patent Number: 5,270,387

[45] Date of Patent: *Dec. 14, 1993

[54] HIGH HEAT STYRENIC COPOLYMER BLENDS HAVING IMPROVED TENSILE PROPERTIES

[75] Inventors: Nigel Sheilds; Gerard B. van de Langkruis, both of Terneuzen, Netherlands

[73] Assignee: The Dow Chemical Company, Midland, Mich.

[*] Notice: The portion of the term of this patent subsequent to Aug. 20, 2008 has been disclaimed.

[21] Appl. No.: 679,871

[22] Filed: Apr. 3, 1991

Related U.S. Application Data

[63] Continuation-in-part of Ser. No. 459,910, Jan. 2, 1990, Pat. No. 5,041,498.

[30] Foreign Application Priority Data

Apr. 5, 1990 [GB] United Kingdom ............ 9007702.5

[51] Int. Cl.$^5$ .................... C08L 55/02; C08L 51/04
[52] U.S. Cl. .................................. 525/71; 525/77; 525/83
[58] Field of Search ...................... 525/71, 77, 83

[56] References Cited

U.S. PATENT DOCUMENTS 3,509,237 3/1970 Aubrey .......................... 260/876

(List continued on next page.)

FOREIGN PATENT DOCUMENTS

| 1327095 | 7/1970 | United Kingdom . |
| 1305779 | 8/1970 | United Kingdom . |
| 1526627 | 3/1977 | United Kingdom . |
| 2141432A | 12/1984 | United Kingdom . |
| 9115544 | 10/1991 | World Int. Prop. O. . |

OTHER PUBLICATIONS

Journal of Colloid Interface Science vol. 89 pp. 94–106 (1982).
Derwant, 83-27729D/12.
Derwant 89-029212/04.
Derwant 89-221996/31.
Derwent 91-089471/13 (J03028258-A. Sumitomo Naugatuck KK). Jan., 1991.

Primary Examiner—James J. Seidleck
Assistant Examiner—W. R. H. Clark

[57] ABSTRACT

A rubber-modified, rigid, heat- and impact resistant polymer composition comprising:

(a) an interpolymer comprising monovinylidene aromatic monomer, maleimide monomer and ethylenically unsaturated nitrile monomer polymerized therein; and (b) from about 7 to about 25 weight percent of a first graft copolymer prepared by an emulsion process and comprising from about 30 to about 70 weight percent of a copolymer (A) comprising in polymerized form from about 10 to about 60 weight percent of an ethylenically unsaturated nitrile monomer and from about 40 to about 90 weight percent of a copolymerizable monovinylidene aromatic monomer, the copolymer (A) being grafted at least in part to a rubbery substrate polymer (B) which is from about 30 to about 70 percent of the graft copolymer by weight and has a rubber particle size distribution wherein the average particle size is from about 0.05 to about 0.65 micron; and (c) from 17 to 85 weight percent of a second graft copolymer prepared by a mass polymerization technique and comprising a copolymer (C) comprising in polymerized form from 15 to 36 weight percent of an ethylenically unsaturated nitrile monomer and from 64 to 85 weight percent of a copolymerizable monovinylidene aromatic monomer, the copolymer (C) being grafted at least in part to a rubbery substrate polymer (D), the substrate polymer having an average particle diameter of less than 1μ, said composition having a total rubber content of from 8.5 to 13.5 weight percent, and a mass rubber to total rubber weight ratio of from 0.09 to 0.4.

23 Claims, No Drawings

U.S. PATENT DOCUMENTS

| | | | |
|---|---|---|---|
| 3,509,238 | 3/1970 | Aubrey et al. | 260/876 |
| 3,551,370 | 12/1970 | Dalton | 260/23.7 |
| 3,644,586 | 2/1972 | Hagerman | 260/880 |
| 3,652,721 | 3/1972 | Dalton et al. | 260/876 R |
| 3,652,726 | 3/1972 | Wield et al. | 260/876 |
| 3,666,704 | 5/1972 | Keppler et al. | 260/29.6 |
| 3,865,717 | 2/1975 | Small | 209/1 |
| 3,928,494 | 12/1975 | Aliberti | 260/876 |
| 3,956,218 | 5/1976 | Keppler et al. | 260/29.7 |
| 4,239,863 | 12/1980 | Bredeweg | 525/263 |
| 4,243,765 | 1/1981 | Keskkula et al. | 525/86 |
| 4,243,769 | 1/1981 | Pritchett | 525/222 |
| 4,250,271 | 2/1981 | Morris et al. | 525/66 |
| 4,419,496 | 12/1983 | Henton et al. | 525/301 |
| 4,567,233 | 1/1986 | Tomono et al. | 525/71 |
| 4,877,826 | 1/1989 | Beyer | 524/377 |
| 4,879,343 | 11/1989 | Aoki et al. | 525/71 |
| 4,946,894 | 1/1990 | Henton et al. | 525/71 |
| 5,041,498 | 8/1991 | Hare et al. | 525/71 | ent application Ser. No. 459,910 which was filed on
HIGH HEAT STYRENIC COPOLYMER BLENDS HAVING IMPROVED TENSILE PROPERTIES

CROSS REFERENCE TO RELATED APPLICATION

This is a continuation-in-part of co-pending U.S. patent application Ser. No. 459,910 which was filed on Jan. 2, 1990 and issued as U.S. Pat. No. 5,041,498 on Aug. 20, 1991.

BACKGROUND OF THE INVENTION

The present invention pertains to certain rubber-modified monovinylidene aromatic polymer compositions which exhibit a beneficial combination of physical characteristics.

It is well known in the art that various relatively rigid and/or brittle interpolymers of monovinylidene aromatic monomers with ethylenically unsaturated nitrile monomers can be made more impact resistant by the inclusion of amounts of various types of elastomeric materials, such as various rubbers, into a matrix or continuous phase of said interpolymers. The elastomeric materials usually are in the form of discrete particles, such particles having amounts of the matrix interpolymer, or an inter- or homopolymer similar thereto, graft-polymerized thereto. These types of rubber-modified, impact-resistant polymeric compositions are commonly known and referred to as graft copolymers or polyblends. Among the best known of these types of compositions are the ABS or ABS-type compositions. Compositionally, ABS or ABS-type compositions generally comprise a combination of an elastomer, usually containing polymerized butadiene, with a rigid interpolymer of a monovinylidene aromatic monomer and an ethylenically unsaturated nitrile monomer. Structurally, ABS or ABS-type compositions usually consist of the rigid, matrix or continuous phase having dispersed therein particles of the elastomer, such particles usually having grafted thereto amounts of the rigid interpolymer or a similar inter- or homopolymer.

It is also well known in the art that the physical properties of these types of compositions are greatly affected by the relative amounts of elastomer particles having different sizes and particle structures, as well as the structures of the individual rubber particles (i.e., rubber particle morphology). There are well-known advantages and disadvantages accompanying the use of either of the two main rubber-particle types in rubber-modified polymer compositions. It is generally believed that grafted rubber particles containing occlusions of matrix polymer therein, this being one of the two main rubber-particle types, provide more impact resistance than the same amount of rubber in the form of similarly grafted, solid rubber particles, the latter being the other main particle type. The grafted, occlusion-containing rubber particles are usually formed and grafted in a mass-type or mass-suspension-type polymerization process where a previously-produced rubber is dissolved in one or more polymerizable monomers with optional diluents, which monomers are thereafter polymerized. Occlusion containing particles, produced in such mass, mass-solution or mass-suspension processes or variations of these processes are hereafter referred to a "mass particles." It is difficult, however, using available types of rubber and mass process equipment to produce groups of mass particles having volume average diameters less than 0.5μ.

The other main type of rubber particle morphology (i.e., the above-mentioned "solid" or non-occluded grafted rubber particle) is usually achieved via emulsion polymerization of the rubber in the form of an aqueous latex. After the rubber is made, monomers which are polymerizable and graftable (e.g., styrene and acrylonitrile) are usually added to the rubber-containing latex and polymerized to form the graft portion as well as amounts of matrix polymer. The non-occluded type of rubber particles, produced via an emulsion polymerization process, are hereinafter referred to as "emulsion particles." When these emulsion particles have been grafted with a different, relatively rigid polymer, but still have a high rubber concentration, at least about 30 weight percent or so, these compositions are very suitable for blending with additional amounts of the same or different rigid polymer, optionally containing additional amounts of rubber, to achieve desired rubber contents in the resultant compositions. Such blendable intermediates are often referred to as "grafted rubber concentrates" and can be used to produce a wide variety of rubber-modified polymer compositions.

It is further known that the heat distortion temperature or softening point of ABS or ABS-type composition can be raised by incorporating into the compositions materials such as N-phenylmaleimide, α-methyl styrene, and copolymers of styrene with maleic anhydride. However, the incorporation of these materials into ABS or ABS-type compositions usually is accompanied by some decrease in other physical properties. For example, the use of styrene-maleic anhydride can result in uncontrolled cross-linking at temperatures greater than 230° C., resulting in unpredictable decreases in impact and melt flow rate properties. Similarly, the use of α-methyl styrene as a comonomer can result in a composition which is difficult to process. Specifically, the use of α-methyl styrene can lower the ceiling temperature of the resulting composition, the result being depolymerization and reduced physical properties. Accordingly, the use of certain materials may improve the heat distortion temperature of an ABS or ABS-type composition, but generally at the expense of other physical properties. Thus, a long-standing problem is the production of an ABS or ABS-type composition having a high heat distortion temperature while also exhibiting impact and tensile strength properties.

U.S. Pat. No. 4,567,233 discloses a rubber-modified styrenic resin composition comprising up to four components. One component is a graft copolymer comprising a specific matrix resin and emulsion rubber particle having an average particle size of from 0.1 to 0.5μ. Another component is a graft copolymer comprising a specific matrix resin and a mass or mass-suspension rubber particle having an average particle size of from 0.7 to 4μ. The amount of the small particle component must be from 50 to 97 percent of the total weight of the two rubber-containing components. A third component includes a copolymer of a vinyl aromatic compound, a maleimide compound, and optionally a copolymerizable vinyl compound. An optional fourth component is a polymer of a vinyl aromatic compound and an unsaturated nitrile compound. Said patent discloses that such compositions have good heat stability and falling dart impact properties. However, the problem of tensile strength is not discussed.

It is known that the use of small rubber particles improves tensile properties for a given rubber content, but sacrifices impact properties. Further, the use of emulsion particles, which generally are smaller, results in degradation of thermal properties, especially the Vicat softening point, compared to the use of mass particles. This is because higher rubber levels are required in an emulsion ABS to attain a given impact value. The Vicat softening point temperature is further reduced by the presence of residuals from the emulsion process. Thus, while the use of emulsion particles in ABS and ABS-type polymers is common for the improvement of certain properties, such use is detrimental to the thermal and tensile strength properties of these resins.

Since the foregoing problem is fairly commonly encountered within the plastics molding industry, it would be highly desirable if there could be provided rubber-modified molding compositions having excellent tensile properties and, particularly, if such could be accomplished without attendant sacrifices in other important properties such as impact strength and heat resistance.

SUMMARY OF THE INVENTION

It has now been discovered that certain rubber-modified monovinylidene aromatic polymer compositions can be provided having very high tensile properties while still maintaining a desirable combination of heat resistance and impact strength by proper and careful control and selection of several key parameters and criterion. In particular, it has been found that in order to suitably accomplish the foregoing, one must utilize the following within the context of the present composition: a mass rubber to total rubber weight ratio of from about 0.09 to about 0.4: said mass rubber ingredient having an average particle size of less than about one micron; as part of the composition a copolymer having a weight average molecular weight of at least about 120,000, said copolymer being polymerized from a monovinylidene aromatic monomer, an ethylenically unsaturated nitrile monomer and a maleimide monomer: and a total rubber content within such composition of from about 8.5 to about 13.5 weight percent on a total composition weight basis. Accordingly, the present invention is an improved rubber-modified, rigid, heat and impact-resistant polymeric blend composition comprising:

(1) from about 7 to about 76 weight percent, based on the rubber-modified composition, of an interpolymer of a monovinylidene aromatic monomer, a maleimide monomer and an ethylenically unsaturated nitrile monomer;

(2) from about 7 to about 25 weight percent, based on the rubber-modified composition, of a first graft copolymer composition, prepared by an emulsion process; and (3) from about 17 to about 85 weight percent, based on the rubber-modified composition, of a second graft copolymer composition prepared by a mass-type process wherein (a) the weight average molecular weight of the interpolymer is at least about 120,000, (b) the first graft copolymer composition comprises from about 30 to about 70 weight percent of a copolymer (A) grafted at least in part to from about 30 to about 70 weight percent of an emulsion rubbery substrate polymer, the substrate polymer having an average particle size of from about 0.05 to about 0.65 micron, (c) the said copolymer (A) comprises in polymerized form from about 10 to about 60 weight percent of an ethylenically unsaturated nitrile monomer and from about 40 to about 90 weight percent of a copolymerizable monovinylidene aromatic monomer, (d) the second graft copolymer composition comprises a copolymer (B) grafted at least in part to a mass rubbery substrate polymer, the substrate polymer having an average particle size of less than about one micron, (e) copolymer (B) comprises in polymerized form from about 15 to about 36 weight percent of an ethylenically unsaturated nitrile monomer and from about 64 to about 85 weight percent of a copolymerizable monovinylidene aromatic monomer, (f) the total rubber content of the said rubber-modified composition comprises from about 8.5 to about 13.5 weight percent, and (g) the weight ratio of rubber particles prepared by mass polymerization to the total rubber content of the rubber-modified composition is from about 0.09 to about 0.4.

Tensile strength is an important physical property for end uses such as automotive interior trim, lighting, cowl vents, air-directing grills, and other applications which require molded parts with the ability to bear loads and to withstand the forces associated with mechanical fastening. The compositions of the present invention are well-suited for such applications in view of the combination of tensile strength, heat resistance, and impact strength exhibited by these compositions.

DETAILED DESCRIPTION OF THE INVENTION

The present invention comprises three essential elements: (a) a monovinylidene aromatic / maleimide / ethylenically unsaturated nitrile interpolymer; (b) a first graft copolymer containing emulsion particles (rubber) dispersed therein; and (c) a second graft copolymer containing mass particles (rubber) dispersed therein. It should be noted that as used herein the terms "polymer" and "polymerization" are generic, and can include the more specific cases of "homo-, co- and interpolymer" and "homo-, co- and interpolymerization," respectively.

The first of the three above-mentioned essential elements of the present invention comprises an interpolymer having polymerized therein maleimide monomer, monovinylidene aromatic monomer and ethylenically unsaturated nitrile monomer. For the purposes of the present invention, these interpolymers are hereinafter referred to as "MSAN-type" since the most common example of these polymers is prepared from a maleimide monomer, styrene, and acrylonitrile. The MSAN-type interpolymer preferably is formed from about 5 to about 43 weight percent of ethylenically unsaturated nitrile monomer, about 14 to about 75 weight percent of monovinylidene aromatic monomer, and about 8 to about 50 weight percent of maleimide monomer. The weight average molecular weight of the MSAN-type polymer advantageously is at least about 120,000 and preferably is at least about 150,000. Preferably, the composition of the present invention comprises from about 7 to about 76 weight percent of the MSAN-type polymer.

Examples of the monovinylidene aromatic monomers which, in polymerized form, may be included in compositions according to the present invention are styrene; alpha-alkyl monovinylidene aromatic monomers including e.g., alpha-methylstyrene, alpha-ethylstyrene, alpha-methylvinyltoluene, alpha-methyl dialkylstyrenes, etc.; ring substituted alkyl styrenes (including e.g., ortho-, meta-, and paravinyl toluene; o-ethylstyrene: p-ethylstyrene; 2,4-dimethylstyrene; p-tertiarybutyl styrene; etc.); ring-substituted halostyrenes including e.g., o-chlorostyrene, p-chlorostyrene, o-bromostyrene, 2,4-dichlorostyrene, etc.; ring-alkyl, ring-halosubstituted styrenes including e.g., 2-chloro-4-methylstyrene, 2,6-dichloro-4-methylstyrene, etc.; vinyl naphthalene; vinyl anthracene, and the like. The alkyl substituents generally have 1 to about 4 carbon atoms and may include isopropyl and isobutyl groups. If so desired, mixtures of such monovinylidene aromatic monomers may be employed. Typically, the monovinylidene aromatic monomer will constitute from about 14 to about 75, preferably from about 50 to about 70, weight percent of the MSAN-type interpolymer.

Maleimide monomers suitably employed in the present invention include maleimide, N-alkylmaleimide and N-aryl maleimide compounds. In the N-aryl maleimides, which are preferred, the aryl substituent may have one or more of the atoms replaced by other inert moieties such as halo or lower alkyl. Suitable N-aryl maleimides are disclosed in U.S. Pat. No. 3,652,726, the teachings of which are incorporated herein by reference. The aryl groups that may be present in the N-aryl maleimides include, for example, phenyl, 4-diphenyl, 1-naphthyl, all the mono- and di-methylphenyl isomers, 2,6-diethylphenyl, 2-, 3- and 4-chlorophenyl, 4-bromophenyl and other mono- and di-halophenyl isomers, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-methoxy-5-chlorophenyl, 2-methoxy-5-bromophenyl, 2,5-dimethoxy-4-chlorophenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl and methyl-chlorophenyl (2,3-, 2,4-, 2,5-and 4,3-isomers). A preferred N-aryl maleimide monomer is N-phenylmaleimide. Mixtures of maleimide monomers may be employed. Suitably, the maleimide monomer is from about 8 to about 50, preferably from about 8 to about 36, weight percent of the MSAN-type interpolymer.

Exemplary of the unsaturated nitrile monomers which may be included are acrylonitrile, methacrylonitrile, ethacrylonitrile, and mixtures thereof. The unsaturated nitrile is generally employed in the MSAN-type interpolymer in an amount of from about 15 to about 43, preferably from about 20 to about 25 weight percent based on the total weight of maleimide monomer, monovinylidene aromatic monomer and ethylenically unsaturated nitrile monomer employed in preparing the MSAN-type interpolymer containing those three monomers.

In addition to maleimide monomers, monovinylidene aromatic monomers and ethylenically unsaturated nitrile monomers, various additional monomers may be desirably included, in polymerized form, in the rubber-modified polymer compositions according to the present invention. Exemplary of such additional monomers are conjugated 1,3 dienes (e.g., butadiene, isoprene, etc.): alpha- or beta-unsaturated monobasic acids and derivatives thereof (e.g., acrylic acid, methylacrylate, ethylacrylate, butyl acrylate, 2-ethylhexyl acrylate, methacrylic acid and the corresponding esters thereof such as methyl methacrylate, etc., acrylamide, methacrylamide and the like); vinyl halides such as vinyl chloride, vinyl bromide, etc.; vinylidene chloride, vinylidene bromide, etc.: vinyl esters such as vinyl acetate, vinyl propionate, etc.: dialkyl maleates or fumarates such as dimethyl maleate, diethyl maleate, dibutyl maleate, the corresponding fumarates, etc. Preferred examples of these additional monomers include $C_{1-4}$ alkyl methacrylates, including mixtures thereof. As is known in the art, the amount of these monomers which may be included will vary as the result of various factors. The amount of such monomers employed will generally be less than about 10 weight percent based on the total weight of the monomers employed in preparing the non-rubber, polymeric portions of the rubber-reinforced product of the invention.

The various additional monomers can be incorporated into compositions according to the present invention in any or all of several ways. For example, one or more of the additional monomers may be interpolymerized into the MSAN-type interpolymer. Additionally, one or more of the additional monomers can be graft polymerized onto, and in the case of mass particles, polymerized and occluded within the rubber particles. In addition, one or more of the additional monomers can be otherwise polymerized into polymeric components which can be combined e.g., blended, into rubber-modified polymer compositions according to the present invention.

The first graft copolymer comprises at least one type of rubber particle, produced in an emulsion polymerization process, the particle being grafted with an SAN or SAN-type interpolymer comprising polymerized therein from about 10 to about 60 weight percent of ethylenically unsaturated nitrile monomer and from about 40 to about 90 weight percent of monovinylidene aromatic monomer. Advantageously, the composition of the present invention comprises from about 7 to about 25 weight percent of the first graft copolymer. Certain preferred compositions of the invention comprise a greater amount of the second graft copolymer than the first graft copolymer. For example, one preferred embodiment of the invention employs 49 percent or less of the first graft copolymer based upon the total weight of the first and second graft copolymer. The emulsion rubber particle can have a monomodal, but preferably has a bimodal, particle size distribution. Thus, the first graft copolymer may contain emulsion particles having different morphologies. The first graft copolymer advantageously comprises from about 30 to about 70 weight percent of the SAN or SAN-type interpolymer and from about 30 to about 70 weight percent emulsion rubber particle. Preferably, the first graft copolymer comprises from about 35 to about 55 weight percent emulsion rubber particle. Preferably, the emulsion rubber particle comprises polybutadiene rubber. The first graft copolymer preferably has a rubber particle size of from about 0.05 to about 0.65μ.

Various substrate rubbers (onto which the superstrate polymer may be grafted during polymerization in the presence of such rubber ) are utilizable as the emulsion particles. These rubbers include diene rubbers, ethylene propylene rubbers, ethylene propylene diene (EPDM) rubbers, acrylate rubbers, polyisoprene rubbers, halogen-containing rubbers and mixtures thereof as well as interpolymers of rubber-forming monomers with other copolymerizable monomers. The preferred rubbers for use in preparing said emulsion particles are diene rubbers or mixtures of diene rubbers, i.e., any rubbery polymers (a polymer having a second order glass transition temperature not higher than 0° C., preferably not higher than −20° C., as determined by ASTM Test D 746-52T) of one or more conjugated 1,3-dienes, e.g., butadiene, isoprene, piperylene, chloroprene, etc. Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g., styrene; a ring-substituted alkylstyrene, such as o-, m-, and p-vinyl toluene or 2,4-dimethylstyrene, the ring-substituted ethylstyrenes, p-tert-butylstyrene, etc.; an alpha-alkylstyrene, such as alpha-methylstyrene, alpha--ethylstyrene, alpha-methyl-p-methylstyrene, etc.; vinyl naphthalene, etc.); ring-substituted halo monovinylidene aromatic hydrocarbons (e.g., the o-, m-, and p-chlorostyrenes, 2,4-dibromostyrene, 2-methyl-4--chlorostyrene, etc.); acrylonitrile: methacrylonitrile; alkyl acrylates (e.g., methyl acrylate, butyl acrylate, 2-ethylhexyl acrylate, etc.): the corresponding alkyl methacrylates: acrylamides (e.g., acrylamide, methacrylamide, N-butyl acrylamide, etc.): unsaturated ketones (e.g., methyl vinyl ketone, methyl isopropenyl ketone, etc.); alpha-olefins (e.g., ethylene, propylene, etc.); pyridines: vinyl esters (e.g., vinyl acetate, vinyl stearate, etc.): vinyl and vinylidene halides (e.g., the vinyl and vinylidene chlorides and bromides, etc.); and the like.

A preferred group of rubbers for use as the emulsion rubber particles are those consisting essentially of from about 70 to 100 percent by weight of butadiene and/or isoprene and up to about 30 percent by weight of monomers selected from the group consisting of monovinylidene aromatic hydrocarbons (e.g., styrene) and unsaturated nitriles (e.g., acrylonitrile) or mixtures thereof. Particularly advantageous emulsion rubbery polymer substrates are butadiene homopolymer or an interpolymer of from about 90 to about 99 percent by weight butadiene and from about 1 to about 10 percent by weight of acrylonitrile and/or styrene.

In a preferred embodiment of the invention in which the first graft copolymer contains bimodal emulsion particles, one of the rubber components hereinafter referred to as the small particle component, has a relatively small average particle size, the particles thereof advantageously having a volume average particle diameter of from about 0.05 to about 0.25μ and preferably a number average particle diameter of from about 0.013 to about 0.17μ. As discussed above, these small-sized particles are most conveniently prepared by emulsion polymerizing a mixture of rubber-forming monomers to form a dispersion of uniformly sized particles of the desired size, as is well known in the art. See for example, U.S. Pat. Nos. 3,509,237: 3,928,494: 4,243,769; and 4,250,271; all of which teach suitable processes; the teachings of which are incorporated herein by reference. It has been found that this component preferably has a volume average particle diameter of from about 0.08 to about 0.20μ, preferably with a number average particle diameter of from about 0.02 to about 0.13μ. Another rubber component to be included in this preferred rubber-modified composition is referred to as the large emulsion particle component. This component has a volume average particle diameter of from about 0.35 to about 0.65μ, preferably from about 0.4 to about 0.6μ.

Since most emulsion polymerization processes do not inherently produce particles in the aforementioned large emulsion particle size range, the particles of this component can be produced by agglomerating or coagulating emulsion-produced dispersions of smaller rubber particles, either before, during or after the particles are grafted. See, for example, U.S. Pat. Nos. 3,551,370; 3,666,704; 3,956,218; and 3,825,621: all of which teach suitable processes; the teachings of which are incorporated herein by reference. A particularly desirable technique for the controlled agglomeration of the particles of an emulsion-prepared rubber in an aqueous dispersion is taught in U.S. Pat. No. 4,419,496, the teachings of which are incorporated herein by reference.

The aforementioned small and large emulsion rubber particles advantageously are employed in a weight ratio range of the former to the latter of from about 0.33 to about 4, and preferably from about 0.4 to about 1. As discussed above, within the ranges of particle types and amounts specified for the emulsion component, the use of the relatively larger particles in this component and/or the use of larger percentages of this component will usually result in better impact-resistance in the resultant polymer composition.

The emulsion particle component advantageously makes up from about 60 to about 91 weight percent of the rubber in the present invention. However, it is preferred to employ from about 60 to about 88 weight percent, while from about 60 to about 70 weight percent is especially preferable. Within these ranges, the amount of emulsion particle rubber helps to control the tensile properties of the resultant polymeric composition. At constant rubber content, increasing the amount of emulsion particle rubber increases the tensile properties. Reducing the percentage of emulsion particle rubber will generally produce tougher resultant compositions with the loss of some tensile properties.

The second graft copolymer comprises at least one type of rubber particle produced in a mass or mass-suspension polymerization process, the particle being grafted with an SAN or SAN-type interpolymer comprising polymerized therein from about 15 to about 36 weight percent of ethylenically unsaturated nitrile monomer and from about 64 to about 85 weight percent of monovinylidene aromatic monomer. Advantageously, the composition of the present invention comprises from about 17 to about 85 weight percent of the second graft copolymer. The mass rubber particle can have a polymodal particle size distribution, such as a bimodal distribution, but preferably has a monomodal particle size distribution. Advantageously, the mass rubber particle has a volume average particle diameter of less than about 1μ.

The rubber substrate used for the second graft copolymer advantageously is a diene homopolymer material, such as poly(1,3-butadiene), or a block or random copolymer of at least 30, more preferably from about 50 to about 85, weight percent, 1,3-butadiene and up to about 70, more preferably from about 15 to about 50, weight percent, of a monovinylidene aromatic compound, preferably styrene. This rubber substrate will, here again, typically have a second order glass transition temperature of 0° C. or less, preferably −20° C. or less. Preferred rubbers for use as the mass rubber particles are homopolymers of butadiene.

The mass particle advantageously has a volume average particle diameter of less than about 1μ, preferably from about 0.15 to about 0.95μ, and a number average particle diameter of from about 0.1 to about 0.45μ. More preferably, the volume average diameter of the particles of this component is from about 0.4 to about 0.9μ and the number average diameter thereof is from about 0.2 to about 0.4μ. Most preferably, the volume average particle size is from about 0.4 to about 0.69μ. The mass particle component advantageously makes up from about 9 to about 40 weight percent of the total rubber in the composition of the present invention, preferably from about 12 to about 40, and most preferably from about 30 to about 40 weight percent thereof. Particles sizes are measured using a commercially available Coulter Counter, by visual phase contrast microscopy or electron microscopy techniques supplemented according to methods well known in the art.

It is generally preferred that the second graft copolymer have a total rubber content of about 20 weight percent or less of the total weight of said graft copolymer, the remainder being an SAN or SAN-type interpolymer. Preferred second graft copolymers thus typically have a rubber content, on the basis of that graft copolymer per se, in the range of from about 0.75 to about 15, especially from about 4 to about 9, weight percent.

Within the above-described ranges, the use of this mass rubber particle component imparts desirable levels of impact-resistance to the resultant polymer compositions without adversely affecting the tensile properties to an expected and unacceptable degree. In fact, compositions according to the present invention exhibit an excellent combination of Vicat, tensile, and impact-resistance for the sizes of the particles and the amount of rubber they contain. The use of the indicated amounts of the indicated mass rubber particles thus provides rubber-modified molding compositions having very high tensile characteristics while still providing desirable levels of impact resistance and Vicat heat resistance.

It has been found most desirable for the second graft copolymer to use particles resulting from a mass-type or mass-suspension-type grafting process which produces particles having grafted thereto and occluded therein amounts of a desired superstrate polymer, preferably an SAN or SAN-type polymer. Such mass processes, as is well known in the art, can be very satisfactorily employed to produce rubber particles having appropriate sizes for utilization in this component. See, for example, U.S. Pat. Nos. 3,509,237 and 4,239,863 which teach suitable processes; the teachings of which are incorporated herein by reference.

In general, in compositions according to the present invention, there will be dispersed therein in the form of particles, a total of from about 8.5 to about 13.5 weight percent rubber, based on the total rubber-modified polymer composition weight. If larger rubber contents are employed, then tensile properties and the Vicat heat distortion temperature generally will be reduced. Preferably, the rubber-modified compositions hereof contain a total of from about 10 to about 13.5 weight percent of dispersed rubbery polymer on a total composition weight basis. Preferably, the weight ratio of mass rubber to total rubber in the composition is from about 0.09 to about 0.4. More preferably, this ratio is from about 0.12 to about 0.4, and most preferably from about 0.3 to about 0.4.

One important criterion of the present invention is that the particulate rubber dispersed in the polymeric matrix comprises at least two different components. It is generally preferred that the dispersed particulate rubber consist essentially of said particulate components. By the term "rubber particle component" is meant a group of rubber particles of the same rubber particle type and having about the same particle size. The two main rubber particle types are (1) the occluded particles made in a mass-type process and (2) the solid, non-occluded particles made in an emulsion polymerization process. Each rubber component can then be characterized by the combination of the average size of the particles and the process by which they are formed. The average particle size of a rubber particle component, as used herein, will, unless otherwise specified, refer to the volume average diameter of the group of particles making up the rubber component of particle type. In most cases, the volume average diameter of a group of particles is the same as the weight average. In the case of the emulsion-produced rubber particles, the average particle diameter measurement is typically made before any of the polymer is grafted thereto, while in the case of the mass particles, the size generally includes the polymer grafted to the rubber particles and occlusions of polymer within the particles. The volume average diameters of emulsion particle groups having average particle diameters of less than about one micron can be conveniently determined, as can the number average diameters and the particle size distribution, by hydrodynamic chromatography (HDC). Hydrodynamic chromatography is explained in U.S. Pat. No. 3,865,717, the teachings of which are incorporated herein by reference, and is also discussed in the *Journal of Colloid and Interface Science*, V. 89, No. 1, pp. 94–106 (1982). In the case of groups of mass particles and groups of emulsion particles having average particle diameters of more than about one micron, the volume average diameters, number average diameters and particle size distributions can be determined by the analysis of transmission electron micrographs of the compositions containing the particles according to methods well known in the art.

It is recognized, of course, that the various rubber particle components comprise particles having a range of sizes: the above analytical techniques indicate, however, that the particles of a particular rubber particle component generally have a fairly narrow range of particle sizes. By this it is meant that the ratio of the volume average particle diameter of a particle group to the number average particle diameter of the same particle group is generally in the range of from about 1 to about 3.5.

Although the aforementioned rubber ingredients may contain up to about 2 percent of a cross-linking agent, based on the weight of the rubber-forming monomer or monomers, cross-linking may present problems in dissolving the rubber in the monomers for the graft polymerization reaction, particularly for a mass or suspension polymerization reaction, and is therefore not generally preferred for mass or suspension polymerized ingredients. In addition, excessive cross-linking can result in loss of the rubbery characteristics and is therefore also not generally preferred even for the emulsion polymerized ingredients. In the event that a cross-linking agent is employed it can be any of the agents conventionally employed for cross-linking diene rubbers, for example, divinylbenzene, diallyl maleate, diallyl fumarate, diallyl adipate, allyl acrylate, allyl methacrylate, diacrylates and dimethylacrylates of polyhydric alcohols (e.g., ethylene glycol dimethylacrylate, etc.), and the like.

It may also be desirable to include in the present ABS-type compositions amounts of other polymers and/or copolymers such as polymers and/or copolymers of phenylene oxide, polycarbonates and polyester polycarbonates.

In graft polymerization reactions, as is well known in the art, the desired polymerizable monomers are combined with the preformed rubber substrate and the monomers are then polymerized to chemically combine or graft at least a portion of the forming polymer upon the rubber substrate. Depending upon the ratio of monomers to rubber substrate and the polymerization conditions, it is possible to achieve both the grafting of the desired amount of polymer onto the rubber substrate and the polymerization of ungrafted polymer to provide all or a portion of the matrix at the same time.

Various techniques are customarily employed for polymerizing rubber monomers including Ziegler-Natta, anionio and free radical polymerization. Free radical emulsion polymerization can be used to produce a latex emulsion which is useful as the base for emulsion polymerization of the graft polymer. See, for example, U.S. Pat. No. 4,243,765, the teachings of which are incorporated herein by reference.

The various techniques suitable for producing the polymeric components of the present invention are well known in the art. Examples of these known polymerization processes include mass, mass-solution, mass-suspension, suspension and emulsion polymerization processes as well as other modification and/or combinations of such processes. See, for example, U.S. Pat. Nos. 3,509,237; 3,923,494; 4,239,863; 4,243,765; and 4,250,271; all of which teach such processes: the teachings of which are incorporated herein by reference. As is well known in the art, the same reaction that is grafting homo- or interpolymer onto one or more of the rubber components can advantageously be used to produce all or part of a corresponding ungrafted homo- or interpolymer for the matrix portion. It should be noted that any production of grafted polymer, in most cases, inherently produces small amounts of ungrafted (i.e. matrix) polymer. Advantageously: (1) small emulsion particles and large emulsion particles are grafted at the same time with monovinylidene aromatic and ethylenically unsaturated nitrile monomers and produce, also at the same time, a small amount of ungrafted SAN or SAN-type interpolymer; (2) the grafting of the mass particles is done with the same or different monovinylidene aromatic and ethylenically unsaturated nitrile monomers in a different, separate process and also produces a portion of the total ungrafted SAN or SAN-type interpolymer desired for the matrix of the final composition; (3) the balance of the ungrafted MSAN-type interpolymer desired as the matrix of the rubber-modified polymer composition hereof is produced separately; and (4) the indicated ingredients are then combined to form the subject polymer compositions. Preferably, the separately produced MSAN-type interpolymer is produced in a mass or mass-solution type of polymerization process.

In general, the matrix portion of the present invention comprises: (1) MSAN-type interpolymer: (2) other comonomers interpolymerized into the MSAN-type interpolymer; (3) additional non-elastomeric polymeric material combined therewith; (4) ungrafted, unoccluded polymer produced during the grafting of the emulsion particles: (5) ungrafted, unoccluded polymer produced during the grafting of the mass particles: and/or (6) other filler-type materials. The weight average molecular weight (Mw) of all the matrix (ungrafted) polymer, from all sources typically is from about 40,000 to at least about 300,000, preferably from about 70,000 to about 200,000. In other words, the Mw's of the ungrafted, unoccluded polymer included in the present rubber-modified polymer compositions, which amounts of polymer: (1) can be produced during the grafting of the emulsion particles: (2) can be produced during the grafting of the mass particles: (3) are the MSAN-type polymer: and/or (4) can be from other sources of ungrafted matrix polymer, will average out to be within the desired range.

When the MSAN-type interpolymer and the first and second graft copolymers are blended together as described herein, a rubber-modified, rigid, heat- and impact-resistant polymer composition is formed. Advantageously, the composition has a Vicat softening point of at least 104° C (DIN-B), preferably at least about 112° C. The impact strength of the compositions of the present invention, as determined by the Charpy method are advantageously at least about 7, and preferably is at least about 9 kJ/m$^2$. The tensile strength at yield is advantageously at least about 50 N/mm$^2$, and preferably is at least about 55 N/mm$^2$. The compositions of the present invention advantageously have an elastic modulus of at least about 2400 MPa, and preferably at least about 2500 MPa.

It should be noted that the weight percentages of the three polymeric components of the invention, i.e. the MSAN-type polymer and the first and second graft copolymers, are based upon the total weight of these components.

Specific Embodiments of the Invention

The present invention is further illustrated by reference to the following specific examples, preparations, and comparative experiments. All parts and percentages are by weight unless otherwise explicitly indicated. Various standard test methods are used to evaluate the physical properties of the various polymer compositions. The notched Izod impact strength values are determined according to ISO 180 4a. Tensile strengths at yield and rupture (Ty and Tr, respectively) and percent elongation are determined according to DIN 53455-6-3. Melt flow rate (MFR) values are determined according to DIN 53735-U. Vicat heat distortion is determined according to DIN 53460, condition B. The Charpy impact is determined according to DIN 53453. The elastic modulus is determined according to DIN 53457. The comparative experiments are not embodiments of the present invention.

Preparation 1, MSAN.1

A mixture of 8 percent N-phenylmaleimide, 52 percent styrene, 20 percent acrylonitrile and 20 percent ethylbenzene is fed to an SAN coil reactor at a temperature between 140 and 146° C. In a separate feed stream a solution of a radical-forming organic compound is supplied to the reactor. The prepolymer of 40 to 70 percent solids is devolatilized by applying vacuum.

Preparation 2, MSAN.2

The procedure of Preparation 1 is repeated except that the feed mixture contains 18 percent acrylonitrile, 48 percent styrene, and 26 percent ethylbenzene, the reactor temperature is from 145 to 152° C., and the prepolymer solution contains from 40 to 60 percent solids.

Preparation of Mass ABS.3 and .4

A mass particle constituent is prepared by dissolving polybutadiene (BUNA HX529C brand rubber available from Bayer A.G.) in a mixture of styrene, acrylonitrile and ethylbenzene, then polymerizing the monomers while agitating and/or otherwise shearing to achieve the desired rubber particle size. During the polymerization some forming interpolymer is grafted to the rubber while some does not graft but forms matrix interpolymer. In this process, as in all grafting processes, varying amounts of matrix interpolymer can be formed (in addition to the grafted portion) depending on the amounts of monomers supplied.

Preparation of Mass ABS.5

The procedure of the Preparation of Mass ABS.3 and .4 is repeated except that a different polybutadiene (BUNA HX565 brand rubber available from Bayer A.G.) is employed. In addition, the large particles of the bimodal distribution are prepared simultaneously in a parallel reactor.

Preparation of Emulsion ABS.6, .7 and .8

An aqueous latex containing particles of rubber is heated while the graftable monomers (styrene and acrylonitrile), mercaptan, persulfate initiator, and emulsifying agent are supplied. The latex, containing the SAN-grafted rubber particles as well as some ungrafted SAN is freeze coagulated, thawed, centrifuged, then air dried to reduce the water content below 1 percent in the resultant powdery polymer composition. This procedure describes the preparation of monomodal emulsion ABS.7 as well as the preparation of the small particles in bimodal emulsion ABS.6 and bimodal emulsion ABS.8.

The bimodal emulsion ABS materials are prepared by adding, prior to the addition of the graftable monomers, about 0.34 weight percent based on the total weight of rubber of an agglomerating agent to the starting aqueous latex of the proceeding paragraph. The agglomerating agent consists of polybutadiene core with a shell of ethylacrylate-methacrylic acid (92/8) copolymer. A portion of particles agglomerate to give a bimodal particle size distribution of large particles and small particles. This latex is then grafted and recovered in the same manner described in the proceeding paragraph.

Further characteristics of the products of the Preparations are given in Table A.

TABLE A

|  | MSAN.1 | MSAN.2 | Mass ABS.3 | Mass ABS.4 |
|---|---|---|---|---|
| Weight % rubber | 0 | 0 | 7.0 | 12.5 |
| Rubber type |  |  | 100% butadiene | 100% butadiene |
| Dv (microns) |  |  | 0.65 | 1.11 |
| Rigid Phase Composition: |  |  |  |  |
| % Acrylonitrile | 21.5 | 21.5 | 24.7 | 24 |
| % Styrene | 64.5 | 64.5 | 75.3 | 76 |
| % N-PMI* | 14 | 14 |  |  |
| Weight Average Molecular Weight | 155,000 | 95,000 | 185,000 | 166,000 |

|  | Mass ABS.5 | Emulsion ABS.6 | Emulsion ABS.7 | Emulsion ABS.8 |
|---|---|---|---|---|
| Weight % rubber | 15 | 52.5 | 55 | 47 |
| Rubber type | 100% butadiene | 100% butadiene | 93:7 butadiene | 93:7/ styrene |
| Dv (microns) | BI-MODAL 0.5 | BI-MODAL 0.07 | 0.15 | BI-MODAL 0.15 |

TABLE A-continued

|  |  |  |  |  |
|---|---|---|---|---|
|  | 2.3 | 0.50 |  | 0.55 |
| Rigid Phase Composition: |  |  |  |  |
| % Acrylonitrile | 24 | 29.5 | 29.5 | 29.5 |
| % Styrene | 75 | 70.5 | 70.5 | 70.5 |
| % N-PMI* |  |  |  |  |
| Weight Average Molecular Weight | 163,000 | 125,000 | 125,000 | 125,000 |

*N-Phenylmaleimide

EXAMPLE 1

A mixture of 20 parts Emulsion ABS.6, 20 parts Mass ABS.3, and 60 parts MSAN.1 are dry blended. The resulting blend is then compounded into a homogeneous melt on a compounder and is extruded into strands which are then pelletized. The pellets are injection molded into standard test bars having the blended composition. Further characteristics of the blended composition and results of physical testing are given in Table 1.

EXAMPLE 2

The procedure of Example 1 is repeated using 15 parts Emulsion ABS.6, 50 parts Mass ABS.3, and 35 parts MSAN.1. Further characteristics of the blended composition and results of physical testing are given in Table 1.

TABLE 1

|  | Example 1 | Example 2 |
|---|---|---|
| Emulsion ABS.6 | 20 | 15 |
| Mass ABS.3 | 20 | 50 |
| MSAN.1 | 60 | 35 |
| % Emulsion rubber | 10.4 | 7.8 |
| % Mass rubber | 1.4 | 3.5 |
| Total rubber content | 11.8 | 11.3 |
| Mass/Total rubber ratio | 0.12 | 0.31 |
| Ty (N/mm$^2$) | 55.2 | 56.0 |
| Tr (N/mm$^2$) | 43.4 | 43.8 |
| Elongation (%) | 25 | 18 |
| E-Mod (MPa) | 2600 | 2520 |
| Vicat (°C.) | 113.0 | 108.9 |
| Charpy (KJ/m$^2$) | 9.2 | 10.5 |
| Izod (J/m) | 119 | 147 |
| MFR (g/(10 min.)) | 4.4 | 5.4 |

EXAMPLES 3-5 AND COMPARATIVE EXPERIMENTS 6-7

The procedure of Example 1 is repeated using the blend components in amounts as specified in Table 2. Further characteristics of the blended composition and results of physical testing are given in Table 2.

TABLE 2

|  | Ex. 3 | Ex. 4 | Ex. 5 | C.E. 6 | C.E. 7 |
|---|---|---|---|---|---|
| Emulsion ABS.6 | 15 | 23 | 17 | 16.4 | 20 |
| Mass ABS.3 | 35 | 17 | 23 | 7.1 | — |
| MSAN.1 | 50 | 60 | 60 | 76.5 | 80 |
| % Emulsion rubber | 7.8 | 11.96 | 8.84 | 8.5 | 10.4 |
| % Mass Rubber | 2.45 | 1.19 | 1.61 | 0.5 | — |
| Total rubber Content | 10.25 | 13.15 | 10.45 | 9.0 | 10.4 |
| Mass/Total rubber ratio | 0.24 | 0.09 | 0.15 | 0.06 | — |
| Vicat (°C.) | 112 | 114 | 115 | 118 | 118 |

TABLE 2-continued

|  | Ex. 3 | Ex. 4 | Ex. 5 | C.E. 6 | C.E. 7 |
|---|---|---|---|---|---|
| Charpy (kJ/m$^2$) | 8.4 | 9.9 | 7.8 | 4.2 | 4.2 |
| Izod (J/m) | 109 | 130 | 85 | 59 | 58 |
| Ty (N/mm$^2$) | 57.6 | 53.9 | 58.1 | 62.4 | 59.6 |
| Tr (N/mm$^2$) | 45.7 | 43.0 | 46.4 | 53.9 | 51.5 |
| Elongation (%) | 18 | 22 | 19 | 13 | 17 |
| E-Mod (MPa) | 2665 | 2445 | 2590 | 2815 | 2725 |
| MFR g/(10 min.) | 5.7 | 4.6 | 5.0 | 4.6 | 4.1 |

The compositions of Examples 3–5 exhibit high heat properties as well as unexpectedly high tensile strengths. Comparative Example 6 is outside the desired range of the mass rubber/total rubber ratio and consequently has an unacceptably low impact value. Comparative Experiment 7 contains no mass ABS and possesses a Charpy value of 4.2, which is too low, despite the fact that the total rubber level is comparable with that of Example 5.

has no mass ABS and too much rubber, possesses a very low modulus.

EXAMPLE 15 and COMPARATIVE EXPERIMENTS 16–18

The procedure of Example 1 is repeated using the blend components in amounts as specified in Table 4. Further characteristics of the blended composition and results of physical testing are given in Table 4.

In Table 4, Mw indicates weight average molecular weight of the MSAN component(s) of the blend. The data in Table 4 demonstrate the effect of the molecular weight of the MSAN with regard to the retention of reasonable (i.e. Charpy>7) impact performance at equivalent tensile properties. For Comparative Experiments 16, 17 and 18, although the rubber levels and ratio of mass-to-total rubber are within the claimed ranges, the MSAN molecular weight of 92,000 is too low to give compositions with desirable impact properties.

TABLE 4

|  | Ex. 1 | Ex. 15 | C. E. 16 | Ex. 10 | C. E. 17 | Ex. 11 | C. E. 18 |
|---|---|---|---|---|---|---|---|
| Emulsion |  |  |  |  |  |  |  |
| ABS.6 | 20 | 20 | 20 | 15 | 15 | 15 | 15 |
| Mass |  |  |  |  |  |  |  |
| ABS.3 | 20 | 20 | 20 | 40 | 40 | 35 | 35 |
| MSAN.1 | 60 | 30 | — | 45 | — | 50 | — |
| MSAN.2 | — | 30 | 60 | — | 45 | — | 50 |
| Mw × 10$^{-3}$ | 150 | 120 | 92 | 150 | 92 | 150 | 92 |
| Vicat | 113 | 113 | 112 | 110 | 110 | 112 | 111 |
| Charpy | 9.2 | 7.9 | 5.6 | 8.8 | 6.7 | 8.4 | 6.0 |
| Izod | 119 | 93 | 69 | 120 | 74 | 109 | 65 |
| MFR | 4.4 | 9.1 | 16.7 | 5.5 | 12.6 | 5.7 | 15.1 |
| Ty | 55.2 | 54.1 | 53.9 | 57.8 | 56.8 | 57.6 | 57.4 |
| Tr | 43.4 | 46.4 | 49.0 | 45.7 | 48.1 | 45.7 | 48.8 |
| Elongation | 25 | 11 | 6 | 19 | 7 | 18 | 10 |
| E-Mod. | 2600 | 2515 | 2586 | 2615 | 2615 | 2665 | 2670 |

EXAMPLES 20–23 AND COMPARATIVE EXPERIMENT 19

TABLE 3

|  | Ex. 8 | Ex. 9 | Ex. 10 | Ex. 11 | Ex. 12 | C. E. 13 | C. E. 14 |
|---|---|---|---|---|---|---|---|
| Emulsion |  |  |  |  |  |  |  |
| ABS.6 | 20 | 20 | 15 | 15 | 10 | 20 | 45 |
| Mass |  |  |  |  |  |  |  |
| ABS.3 | 45 | 30 | 40 | 35 | 50 | 60 | — |
| MSAN.1 | 35 | 50 | 45 | 50 | 40 | 20 | 55 |
| % Emulsion | 10.4 | 10.4 | 7.8 | 7.8 | 5.2 | 10.4 | 23.4 |
| % Mass | 3.15 | 2.1 | 2.8 | 2.45 | 3.5 | 4.2 | — |
| Total rubber | 13.55 | 12.5 | 10.6 | 10.25 | 8.7 | 14.6 | 23.4 |
| Mass/Total ratio | 0.23 | 0.17 | 0.26 | 0.24 | 0.4 | 0.29 | — |
| Vicat | 107 | 112 | 110 | 112 | 110 | 104 | 108 |
| Charpy | 12.6 | 9.5 | 8.8 | 8.4 | 7.9 | 14.5 | 14.6 |
| Izod | 193 | 128 | 120 | 109 | 102 | 237 | 221 |
| MFR | 4.7 | 5.3 | 5.5 | 5.7 | 5.5 | 4.3 | 2.3 |
| Ty | 51.4 | 55.2 | 57.8 | 57.6 | 59.9 | 50.5 | 42.8 |
| Tr | 39.9 | 44.6 | 45.7 | 45.7 | 47.9 | 38.2 | 34.5 |
| Elongation | 19 | 21 | 19 | 18 | 9 | 19 | 14 |
| E-Mod. | 2445 | 2550 | 2615 | 2665 | 2735 | 2290 | 1845 |

Examples 8–12 are embodiments of the invention exhibiting high Vicat softening temperatures with unexpectedly high tensile properties. Comparative Example 13 contains 14.6 percent rubber which is above the upper limit for the rubber level as specified in this invention. Consequently, although the impact is high, the Young's Modulus is too low. Comparative Experiment 14, which is outside the scope of the invention since it The procedure of Example 1 is repeated using the blend components in amounts as specified in Table 5. Further characteristics of the blended composition and results of physical testing are given in Table 5.

The grade of methacrylate-butadiene-styrene (referred to as "MBS" in Table 5) rubber used is Paraplex 3607 from the Rohm and Haas Company. (Paraplex is a trademark of the Rohm and Haas Company).

In the examples summarized in Tables 1-4, the emulsion ingredient in the blend system has rubber particles made from essentially 100% butadiene. However, as is illustrated by Examples 20 and 22, emulsion rubber particles consisting of 93 percent butadiene with 7 percent styrene are within the scope of the invention. The use of monomodal emulsion ABS is also shown in Example 20. The use of bimodal mass ABS is shown in Example 21. Alternative impact modification packages, such as mixtures of emulsion ABS with MBS are shown in Example 23 to give blends with properties in the desired ranges. However, for a monomodal mass ABS component, a rubber particle size of 1.11 micron was found to be above the upper limit for maintaining good tensile properties as is illustrated by Comparative Experiment 19.

TABLE 5

|  | C. E. 19 | Ex. 20 | Ex. 21 | Ex. 22 | Ex. 23 |
|---|---|---|---|---|---|
| Emulsion ABS.6 | 20 | — | 13.4 | — | — |
| Emulsion ABS.7 | — | 20 | — | — | — |
| Emulsion ABS.8 | — | — | — | 15 | — |
| Mass ABS.3 | — | 35 | — | 50 | 49 |
| Mass ABS.4 | 45 | — | — | — | — |
| Mass ABS.5 | — | — | 40.6 | — | — |
| MSAN.1 | — | 45 | 46.0 | 35 | 35 |
| MSAN.2 | 35 | — | — | — | — |
| MBS | — | — | — | — | 3 |
| Vicat (°C.) | 104 | 111 | 110 | 110 | 110 |
| Charpy (kJ/m$^2$) | 13.1 | 13.3 | 10.3 | 9.6 | 9.3 |
| Izod (J/m) | 202 | 203 | 167 | 136 | 156 |
| MRF (DIN) (g/10 min.) | 10.15 | 3.2 | n.m. | 4.6 | n.m. |
| Ty (N/mm$^2$) | 43.5 | 52.7 | 50.0 | 56.6 | 53.5 |
| Tr (N/mm$^2$) | 35.5 | 41.1 | 40.7 | 43.8 | 41.7 |
| Elongation (%) | 29 | 21 | 38 | 22 | 16 |
| E-Mod. (MPa) | 2200 | 2410 | 2460 | 2590 | 2410 | n.m. = not measured

What is claimed is:

1. A rubber-modified composition comprising a blend of:
   (1) from about 7 to about 76 weight percent, based on the rubber-modified composition, of an interpolymer of a monovinylidene aromatic monomer, a maleimide monomer and an ethylenically unsaturated nitrile monomer;
   (2) from about 7 to about 25 weight percent, based on the rubber-modified composition, of a first graft copolymer composition, prepared by an emulsion process; and
   3) from about 17 to about 85 weight percent, based on the rubber-modified composition, of a second graft copolymer composition prepared by a mass-type process; wherein:
      (a) the weight average molecular weight of the interpolymer is at least about 120,000;
      (b) the first graft copolymer composition comprises from about 30 to about 70 weight percent of a copolymer (A) grafted at least in part of from about 30 to about 70 weight percent of an emulsion rubbery substrate polymer, the substrate polymer having an average particle size of from about 0.05 to about 0.65 micron;
      (c) the said copolymer (A) comprises in polymerized form from about 10 to about 60 weight percent of an ethylenically unsaturated nitrile monomer and from about 40 to about 90 weight percent of a copolymerizable monovinylidene aromatic monomer;
      (d) the second graft copolymer composition comprises a copolymer (B) grafted at least in part to a mass rubbery substrate polymer, the substrate polymer having an average particle size of less than one micron;
      (e) copolymer (B) comprises in polymerized form from about 15 to about 36 weight percent of an ethylenically unsaturated nitrile monomer and from about 64 to about 85 weight percent of a copolymerizable monovinylidene aromatic monomer;
      (f) the total rubber content of the said rubber-modified composition is from about 8.5 to about 13.55 weight percent;
      (g) the weight ratio of rubber particles prepared by mass polymerization to the total rubber content of the rubber-modified composition is from about 0.09 to about 0.4; and
      (h) the amount of the first graft copolymer is 49 percent or less based upon the total weight of the first and second graft copolymers.

2. The composition of claim 1 wherein the emulsion rubbery substrate polymer has a bimodal rubber particle size distribution wherein the peak particle size value is from about 0.05 to about 0.25μ for the small particles and from about 0.35 to about 0.75μ for the large particles.

3. The composition of claim 1 wherein the maleimide monomer comprises N-phenylmaleimide.

4. The composition of claim 1 wherein the molecular weight of the interpolymer is at least about 150,000.

5. The composition of claim 1 wherein the total rubber content is from about 10 to about 13.5 weight percent.

6. The composition of claim 1 having a Charpy impact value of at least 7 kJ/m$^2$.

7. The composition of claim 1 having a Vicat heat distortion temperature of at least 104° C.

8. The composition of claim 1 having a tensile yield of at least 50 N/mm$^2$.

9. The composition of claim 1 having an elastic modulus of at least 2400 MPa.

10. The composition of claim 1 wherein the interpolymer comprises from about 15 to about 43 weight percent of an ethylenically unsaturated nitrile monomer, from about 8 to about 50 weight percent of an N-aryl maleimide monomer, and from about 14 to about 75 weight percent of a monovinylidene aromatic monomer.

11. The composition of claim 1 wherein the second graft copolymer comprises from 0.75 to 15 weight percent rubber.

12. The composition of claim 1 wherein the Vicat heat distortion temperature is at least 112° C.

13. A rubber-modified composition comprising a blend of:
   (1) from 7 to 76 weight percent, based on the rubber-modified composition, of an interpolymer prepared from a monomer mixture comprising styrene, a maleimide monomer and acrylonitrile;
   (2) from 7 to 25 weight percent, based on the rubber-modified composition, of a first graft copolymer composition, prepared by an emulsion process; and
   (3) from 17 to 18 weight percent, based on the rubber-modified composition, of a second graft copolymer composition prepared by a mass-type process; wherein;
(a) the weight average molecular weight of the interpolymer is at least 120,000;
(b) the first graft copolymer composition comprises from 30 to 70 percent of a copolymer (A) grafted at least in part to from 30 to 70 weight percent of an emulsion rubber substrate polymer, the substrate polymer having an average particle size of from 0.05 to 0.65 micron;
(c) the said copolymer (A) comprises in polymerized from 10 to 60 weight percent acrylonitrile and from 40 to 90 weight percent styrene;
(d) the second graft copolymer composition comprises a copolymer (B) grafted at least in part to a mass rubber substrate polymer, the substrate polymer having an average particle size of less than one micron;
(e) copolymer (B) comprises in polymerized form from 15 to 36 weight percent acrylonitrile and from 64 to 85 weight percent styrene;
(f) the total rubber content of the said rubber-modified composition is from 8.5 to 13.55 weight percent;
(g) the weight ratio of rubber particles prepared by mass polymerization to the total rubber content of the rubber-modified composition is from 0.09 to 0.4;
(h) the amount of the first graft copolymer is 49 percent of less based upon the total weight of the first and second graft copolymers;
(i) the tensile yield of the blend is at least 50 N/mm$^2$; and
(j) the elastic modulus of the blend is at least 2400 MPa.

14. The composition of claim 13 wherein the maleimide monomer comprises N-phenylmaleimide.

15. The composition of claim 14 wherein the emulsion rubbery substrate polymer has a bimodal rubber particle size distribution wherein the peak particle size value is from 0.05 to 0.25$\mu$ for the small particles and from 0.35 to 0.75$\mu$ for the large particles.

16. The composition of claim 15 wherein the molecular weight of the interpolymer is at least 150,000.

17. The composition of claim 16 wherein the total rubber content is from 10 to 13.5 weight percent.

18. The composition of claim 13 wherein the composition has a Charpy impact value of at least 7 mJ/m$^2$, and a Vicat heat distortion temperature of at least 104° C.

19. The composition of claim 18 wherein the Vicat heat distortion temperature is at least 112° C.

20. The composition of claim 13 wherein the interpolymer comprises from 15 to 43 weight percent acrylonitrile, from 8 to 50 weight percent of an N-aryl maleimide monomer, and from 14 to 75 weight percent styrene.

21. A rubber-modified composition comprising a blend of:
(1) from 7 to 76 weight percent, based on the rubber-modified composition, of an interpolymer prepared from a monomer mixture comprising styrene, N-phenyl maleimide and acrylonitrile;
(2) from 7 to 25 weight percent, based on the rubber-modified composition, of a first graft copolymer composition, prepared by an emulsion process; and
(3) from 17 to 85 weight percent, based on the rubber-modified composition, of a second graft copolymer composition prepared by a mass-type process; wherein:
(a) the weight average molecular weight of the interpolymer is at last 120,000;
(b) the first graft copolymer composition comprises from 30 to 70 weight percent of a copolymer (A) grafted at least in part of from 30 to 70 weight percent of an emulsion rubbery substrate polymer, the substrate polymer having a bimodal rubber particle size distribution wherein the peak particle size value is from 0.05 to 0.25$\mu$ for the small particles and from 0.35 to 0.75$\mu$ for the large particles;
(c) the said copolymer (A) comprises in polymerized form from 10 to 60 weight percent acrylonitrile and from 40 to 90 weight percent styrene;
(d) the second graft copolymer composition comprises a copolymer (B) grafted at least in part to a mass rubbery substrate polymer, the substrate polymer having an average particle size of from about 0.40 to about 0.69 micron;
(e) copolymer (B) comprises in polymerized form from 15 to 36 weight percent acrylonitrile and from 64 to 85 weight percent styrene;
(f) the total rubber content of the said rubber-modified composition is from 8.5 to 13.55 weight percent;
(g) the weight ratio of rubber particles prepared by mass polymerization to the total rubber content of the rubber-modified composition is from 0.09 to 0.4;
(h) the amount of the first graft copolymer is 49 or less based upon the total weight of the first and second graft copolymers; and
(i) the blend has a Charpy impact value of at least 7 kJ/m$^2$, a Vicat heat distortion temperature of at least 104° C., a tensile yield of at least 50 N/mm$^2$, and an elastic modulus of at least 2400 MPa.

22. The composition of claim 21 wherein the Vicat heat distortion temperature is at least 112° C.

23. The composition of claim 1 wherein the emulsion rubbery substrate polymer has a monomodal rubber particle size distribution.

* * * * *

UNITED STATES PATENT AND TRADEMARK OFFICE
CERTIFICATE OF CORRECTION

PATENT NO.   : 5,270,387
DATED        : Dec. 14, 1993
INVENTOR(S)  : Nigel Shields; Gerard B. van de Langkruis It is certified that error appears in the above-indentified patent and that said Letters Patent is hereby corrected as shown below:

Title Page, item [19] "Sheilds et al" should read --Shields et al--
Title page, Inventors, "Sheilds" should read --Shields--

Col. 18, Claim 13, line 67, "18" should read --85--
Col. 19, line 8, "rubber" should read --rubbery--;
Col. 19, line 17, "rubber" should read --rubbery--
Col. 19, line 32, "of" should read --or--
Col. 19, line 51, "mJ" should read --kJ--
Col. 20, line 17, "last" should read --least--
Col. 20, line 34, "0.40" should read --0.4--

Signed and Sealed this

Fourth Day of October, 1994

Attest:

BRUCE LEHMAN

Attesting Officer           Commissioner of Patents and Trademarks